United States Patent Office 3,632,569
Patented Jan. 4, 1972

3,632,569
MONAZO DYESTUFFS CONTAINING A META-ACYLAMINO-PARA-AMINO ANILINE GROUP
Klaus Artz, Muttenz, Switzerland, Nalin Binduprasad Desai, Goregaon, Bombay, India, and Hans Wilhelm Liechti, Oberwil, Basel, Switzerland, assignors to Ciba Limited, Basel, Switzerland
No Drawing. Filed June 4, 1968, Ser. No. 734,247
Claims priority, application Switzerland, June 7, 1967, 8,066/67
Int. Cl. C09b 29/08, 29/26; D06p 1/08
U.S. Cl. 260—205                                7 Claims

ABSTRACT OF THE DISCLOSURE

Azo dyestuffs of the formula

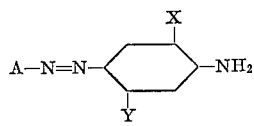

in which A represents the residue of an aromatic diazo component, X represents hydrogen, alkyl or alkoxy and Y represents an amino group bearing an acyl residue of a monovalent sulphonic acid, an acyl residue of a carbonic acid semi-ester or a carbamic acid. The dyes are suitable for dyeing fibres such as polyester and cellulose and have good fastness to light and sublimation.

---

The present invention relates to meta-acylamino-para-amino-azobenzene dyestuffs and to the dyeing of polyester fibres with such dyestuffs.

Although the dyeing of secondary acetate rayon with meta-acetyl-amino-para-amino-meta nitro-azobenzene has already been proposed in French patent specification No. 608,934, the dyeings obtained therewith possess inadequate fastness to light. It could therefore not be expected that isomeric and analogous dyestuffs of this type would be suitable for dyeing polyester fibres. In British patent application No. 529,454, 4-nitro-3'-acetylamino-4'-amino-1,1'-azobenzenes are described as intermediate products, that is to say, diazo components, for use in the manufacture of diazo dyestuffs, but their use in dyeing is not proposed in the said specification.

The present invention provides azo dyestuffs of the formula

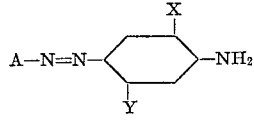

in which A represents the residue of an aromatic diazo component negatively substituted at para-position, X represents a hydrogen atom or an alkyl or alkoxy group and Y represents an amino group bearing an acyl residue of a monovalent sulphonic acid or an acyl residue of a carbonic acid semi-ester or a carbamic acid.

The azo dyestuffs of the invention may be further defined as follows:

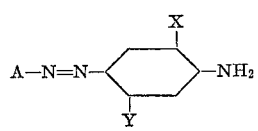

in which A represents the residue of an aromatic diazo component of the benzene series carrying in para-position to the azo group a group with a positive Hammet sigma value, X is hydrogen, methyl or $C_1$-$C_2$ alkoxy, and Y is a hydrocarbylsulfonylamino containing up to 7 carbon atoms, hydrocarboylamino containing up to 8 carbon atoms, hydrocarbyloxycarbonylamino containing up to 6 carbon atoms or hydrocarbylaminocarbonylamino containing up to 8 carbon atoms.

The present invention also provides a process for dyeing and printing fibres made from aromatic polyesters, especially polyethylene terephthalate, wherein the dyestuffs used are water-insoluble azo dyestuff of the formula

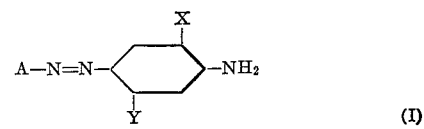

in which A represents the residue of an aromatic diazo component negatively substituted at para-position, X represents a hydrogen atom or an alkyl or alkoxy group and Y represents an acylated amino group, the acyl group containing at least 4 atoms.

The dyestuffs to be used in accordance with the process of the invention may be obtained by coupling the diazo compound of an aromatic amine with an arylamine. The following amines are given as examples of diazo components:

1-amino-4-chlorobenzene,
1-amino-4-bromobenzene,
1-amino-4-methylbenzene,
1-amino-4-nitrobenzene,
1-amino-4-cyanobenzene,
1-amino-2,5-dicyanobenzene,
1-amino-4-methylsulphonylbenzene,
1-amino-4-carbomethoxybenzene,
1-amino-2,4-dichlorobenzene,
1-amino-2,4-dibromobenzene,
1-amino-2-methyl-4-chlorobenzene,
1-amino-2-trifluoromethyl-4-chlorobenzene,
1-amino-2-cyano-4-chlorobenzene,
1-amino-2-carbomethoxy-4-chlorobenzene,
1-amino-2-carbomethoxy-4-nitrobenzene,
1-amino-2-chloro-4-cyanobenzene,
1-amino-2-chloro-4-nitrobenzene,
1-amino-2-phenoxy-4-nitrobenzene,
1-amino-2-chloro-4-carbethoxybenzene,
1-amino-2-chloro-4-methylsulphonylbenzene,
1-amino-2-methylsulphonyl-4-chlorobenzene,
1-amino-2-methylsulphonyl-4-nitrobenzene,
1-amino-2,4-dinitrobenzene,
1-amino-2,4-dicyanobenzene,
1-amino-2-cyanomethylsulphonylbenzene,
1-amino-2,6-dichloro-4-cyanobenzene,
1-amino-2,6-dichloro-4-nitrobenzene,
1-amino-2,4-dicyano-6-chlorobenzene,
1-amino-2,5,6-trinitrobenzene,
1-amino-2,4-dinitro-6-chlorobenzene and especially 1-amino-2-cyano-4-nitrobenzene, 4-aminoazobenzene,
4-amino-3-nitro-1,1'-azobenzene,
4-amino-3-nitro-4'-chloro-1,1'-azobenzene,
4-amino-3-nitro-2'-chloro-1,1'-azobenzene,
4-amino-3-nitro-2'-methoxy-1,1'-azobenzene, and
4-amino-3-nitro-4'-methyl-1,1'-azobenzene.

Preferred substances are aminobenzenes which contain a negative substituent (this is to say, a substituent having positive Hammet sigma values, for example, para-nitro- or para-phenyl-azo residues) in para-position.

The following aminobenzenes are given as examples of coupling components:

1-amino-3-acetylaminobenzene,
1-amino-3-propionylaminobenzene,
1-amino-3-butyrylaminobenzene,
1-amino-3-isobutyrylaminobenzene,
1-amino-3-succinylimidoaminobenzene,
1-amino-3-benzoylaminobenzene,
1-amino-3-furoylaminobenzene,
1-amino-3-thienoylaminobenzene,
1-amino-3-nicotinylaminobenzene,
1-amino-3-N-methyl-N-acetylaminobenzene,
1-amino-3-methoxycarbonylaminobenzene,
1-amino-3-ethoxycarbonylaminobenzene,
1-amino-2-methyl-5-acetylaminobenzene,
1-amino-2-methoxy-5-acetylaminobenzene,
1-amino-2-ethoxy-5-acetylaminobenzene,
1-amino-2-dimethylamino-5-acetylaminobenzene, and
1-amino-3-cinnamoylaminobenzene.

The coupling components may be obtained, for example, by reduction of the nitro group of 3-N-acylaminonitrobenzenes.

The 3-N-acylaminonitrobenzenes may be obtained by acylating meta-nitroaniline with carboxylic acid halides or anhydrides, sulphonyl chlorides, isocyanates or chloroformic acid esters, for example, acetic anhydride, cinnamic acid chloride, methane-, ethane-, phenyl-, paratolyl- or para-bromobenzene-sulphochloride, 5-methylthiophene - 2 - sulphonyl chloride, chloroformic acid methyl ester, ethylester, n-butylester, phenylester, 4-carbomethoxy-phenylester, 4-carboxylic amido-phenylester and 2,4-dicarbomethoxyphenylester, methylisocyanate, ethylisocyanate, n-propylisocyanate, n-butylisocyanate, octylisocyanate, methylisocyanatoacetate, butylisocyanatoacetate, cyclohexylisocyanate, phenylisocyanate, para-tolylisocyanate, ortho-, meta- and para-chlorophenylisocyanate, meta- and para-nitrophenylisocyanate, 2,5-dichlorophenylisocyanate, ortho- and para-methoxyisocyanate, 2-naphthylisocyanate, 2-biphenylisocyanate, 2 - isocyanatotetrahydropyran, tetrahydrofurfurylisocyanate, 3 - isocyanatopyridine, 2-furylisocyanate, 3-isocyanato-N-ethylcarbazole and preferably isocyanates of heterocycles containing sulphur, for example, 2 - carbomethoxy-3-isocyanatothiophene, 2-isocyanato-3-cyanothiophene, 2 - isocyanato-3-carbomethoxy-4-methylthiophene, 2-isocyanato-5-methylthiophene-3-carboxylic acid amide, 2-isocyanato-3-carbomethoxy-3,4-dimethylthiophene, 2 - isocyanato-3-carboethoxy-3,4-tetramethylenethiophene and 3-isocyanatosulpholan.

In the dyestuffs of the Formula I to be used in accordance with the invention, A preferably represents a benzene residue substituted in para-position by negative groups preferably a benzene residue which contains only negative substituents and Y preferably represents an amino group which contains an acyl residue of a monovalent carboxylic acid or sulphonic acid or an acyl residue of a carbonic acid semi-ester or a carbamic acid. Dyestuffs in which the aminoacyl residue carries the acyl group of a mono-carboxylic acid are described in British patent specification No. 529,454 as intermediate products, namely as diazo components for use in the manufacture of diazo dyestuffs.

Dyestuffs which are especially suitable for use in the present invention are those in which
A represents a residue of the formula

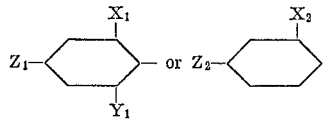

in which $X_1$ represents a hydrogen or a halogen atom or a nitro, cyano, carbalkoxy or alkylsulphonyl group, $X_2$ represents a hydrogen atom or a nitro group, $Y_1$ represents a hydrogen or a halogen atom or an alkyl, cyano or trifluoromethyl group, $Z_1$ represents a chlorine atom or a methylsulphonyl, cyano or nitro group and $Z_2$ represents a phenyl azo group which may be substituted, preferably $Z_1$ or $Z_2$ represents a nitro or phenylazo group.

Dyestuffs of the formula

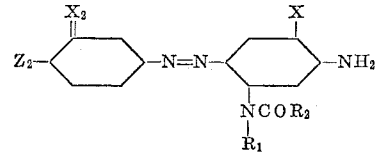

in which $R_1$ and X each represent a hydrogen atom or an alkyl group and $R_2$ represents an alkyl alkoxy, benzene or a heterocyclic residue, are also advantageously used in the dyeing process of the present invention. $R_2$ is preferably an alkoxy residue.

The groups in the above formula may be further defined as $R_1$ being hydrogen or methyl, X being hydrogen $C_{1-2}$-alkoxy, methyl or dimethylamino, $R_2$ being alkyl of up to 8 carbon atoms, alkoxy of up to 6 carbon atoms, aralkyl of up to 7 carbon atoms or aryl of up to 6 carbon atoms, $Z_2$ being hydrogen, nitro, chloro, bromo, cyano, carbomethoxy, methylsulfonyl, carboethoxy or methyl, and $X_2$ being hydrogen, chloro, cyano, bromo, methyl, trifluoromethyl, methoxy, carbomethoxy, phenoxy,, methylsulfonyl, cyanomethylsulfonyl or nitro.

In certain cases it may be of advantage to use a mixture of two or more of the dyestuffs to be used in accordance with the invention.

For dyeing, the dyestuffs are advantageously used in a finely divided form and dyeing is carried out in the presence of a dispersing agent, for example, sulphite cellulose waste liquor or a synthetic detergent, or a combination of different wetting agents and dispersing agents. Prior to dyeing, it is generally advantageous to convert the dyestuff into a dyeing preparation which contains a dispersing agent and the dyestuff in a form such that a fine dispersion is obtained when the preparation is diluted with water. Such dyestuff preparations may be obtained by a method known per se, for example, by grinding the dyestuff in the dry or wet state in the presence or absence of a dispersing agent.

To obtain stronger dyeings on polyethylene terephthalate fibres it is generally advantageous to add a swelling agent to the dyebath, or more especially to carry out the dyeing process under superatmosphere pressure at a temperature above 100° C. for example, at 120° C. Suitable swelling agents are aromatic carboxylic acids, for example, benzoic acid and salicyclic acid; phenols, for example, ortho- or para-hydroxydiphenyl; salicyclic acid methyl ester; aromatic halogen compounds, for example, chlorobenzene, ortho-dichlorobenzene and trichlorobenzene; and phenylmethylcarbinol or diphenyl. When carrying out the dyeing process under superatmospheric pressure it is generally advantageous to render the dyebath slightly acidic, for example, by the addition of a weak acid, for example actic acid.

The dyestuff to be used in accordance with the invention are specially suitable for application by the so-called thermofixation process in which the material to be dyed is impregnated at a temperature not exceeding 60° C. with an aqueous dispersion of the dyestuff which advantageously contains 1 to 50% of urea and a thickening agent, especially sodium alginate, and then squeezed in the usual manner. The impregnated material is advantageously squeezed so as to retain within the range of from 50 to 100% of its dry weight of dye-liquor.
101.51
To fix the dyestuff, the material so impregnated is heated to a temperature above 100° C., for example, to a temperature within the range of from 180 to 220° C., advantageously after drying, for example, in a current of warm air.

The aforementioned thermofixation process is specially suitable for the dyeing of union fabrics made from polyester fibres and cellulosic fibres, especially cotton. In this case in addition to the dyestuffs to be used in accordance with the invention, the padding liquor contains dyestuffs suitable for dyeing cotton, for example, direct dyestuffs or vat dyestuffs, or especially so-called reactive dyestuffs, that is to say, dyestuffs capable of being fixed on the cellulosic fibre by the formation of a chemical bond, for example, dyestuffs which contain a chlorotriazine or chlorodiazine residue. In the last-mentioned case, it is generally advantageous to add an agent capable of binding acid to the padding liquor, for example, an alkali metal carbonate, an alkali metal phosphate, an alkali metal borate or an alkali metal perborate, or mixtures thereof. When using vat dyestuffs, the padded fabric must be treated after the heat treatment with an aqueous alkaline solution of one of the reducing agents commonly used in vat dyeing.

The dyeings produced on polyester fibres in accordance with the process of the present invention are advantageously subjected to an after-treatment, for example, by heating with an aqueous solution of a non-ionic detergent.

The dyestuffs to be used in accordance with the process of the present invention may also be applied by printing processes. In this method of application a printing paste is used which contains, for example, in addition to the usual printing adjuvants, for example, thickening and wetting agents, the finely divided dyestuff, if necessary, in admixture with one of the above-mentioned cotton dyestuffs, if necessary, together with urea and/or an agent capable of binding acid.

The dyeings and prints obtained in accordance with the process of the invention display excellent properties of fastness, especially good fastness to light, sublimation, decatizing, washing and chlorinated water. Furthermore, dyeings produced on cellulose acetate rayon possess good fastness to burnt gas fumes. A further advantage lies in the fact that the dyestuffs used in accordance with the invention reserve well on wool and cotton.

The following examples illustrate the invention. Unless otherwise stated, the parts and percentages are by weight.

EXAMPLE 1

1 part of the dyestuff of the formula

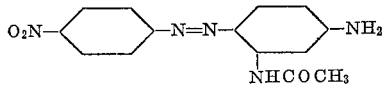

is ground wet with 2 parts of a 50% aqueous solution of the sodium salt of 1,1′ - dinaphthylmethane - 2,2′ - disulphonic acid and the batch is then dried.

The dyestuff preparation so obtained is mixed with 40 parts of a 10% aqueous solution of the sodium salt of N-benzyl-μ-heptadecylbenzimidazole disulphonic acid and then 4 parts of a 40% acetic acid solution are added. A dyebath of 4000 parts is prepared therefrom by dilution with water.

100 parts of cleaned polyester fibre material are introduced into this dyebath at 50° C., the temperature is raised to 120 to 130° C. during half an hour and dyeing is carried out for one hour at that temperature in a closed vessel. The material is then rinsed well. A strong, orange dyeing possessing excellent fastness to light and sublimation is obtained.

The dyestuff may be obtained in the following manner: 13.8 parts of 1-amino-4-nitrobenzene are dissolved in 30 parts of water and 30 parts of concentrated hydrochloric acid. 80 parts of ice are added and then 6.9 parts of sodium nitrite are introduced and the batch is stirred until the diazo solution is clear and almost colourless. A solution of 15 parts of 3-amino-acetanilide, dissolved in 190 parts of water, is slowly added at 0 to 5° C., while stirring and cooling. Stirring is carried out for 30 minutes, whereupon buffering is effected with sodium acetate to produce a pH of 3 to 4, and then the dyestuff of the formula

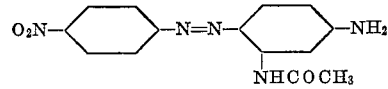

is isolated by filtration and dried.

The following table lists components for further dyestuffs. The dyestuffs may be obtained by coupling a diazo compound of one of the amines listed in Column I with a coupling component listed in Column II. The shade produced in polyethylene terephthalate fibres by each dyestuff so obtained are indicated in Column III.

| | I | II | III |
|---|---|---|---|
| 1 | 1-amino-2,4-dinitrobenzene. | 1-amino-3-acetylaminobenzene. | Red. |
| 2 | 1-amino-2-chloro-4-nitrobenzene. | ___do___ | Red. |
| 3 | 1-amino-2,6-dichloro-4-nitrobenzene. | ___do___ | Brown. |
| 4 | 1-amino-2,4-dinitro-6-chlorobenzene. | ___do___ | Violet. |
| 5 | 1-amino-2-cyano-4-nitrobenzene. | ___do___ | Claret. |
| 6 | 1-amino-2-cyano-4-nitro-6-chlorobenzene. | ___do___ | Violet. |
| 7 | 1-amino-2-carbomethoxy-4-nitrobenzene. | ___do___ | Scarlet. |
| 8 | 1-amino-2-cyano-4-nitrobenzene. | 1-amino-3-propionylaminobenzene. | Claret. |
| 9 | 1-amino-2-chloro-4-nitrobenzene. | 1-amino-3-isobutyrylaminobenzene. | Red. |
| 10 | 1-amino-4-nitro-2,6-dichlorobenzene. | 1-amino-3-benzoylaminobenzene. | Brown. |
| 11 | 1-amino-2,4-dinitrobenzene. | 1-amino-2-methoxy-5-acetylaminobenzene. | Violet. |
| 12 | ___do___ | 1-amino-2-methoxy-5-propionylaminobenzene. | Do. |
| 13 | 1-amino-2,4-dinitro-6-chlorobenzene. | 1-amino-2-ethoxy-5-propionylaminobenzene. | Blue. |
| 14 | 4-amino-3-nitro-1,1′-azobenzene. | 1-amino-3-acetylaminobenzene. | Red. |
| 15 | 4-amino-3-nitro-4′-chloro-1,1′-azobenzene. | ___do___ | Red. |
| 16 | 4-amino-3-nitro-2′-chloro-1,1′-azobenzene. | ___do___ | Red. |
| 17 | 4-amino-3-nitro-2′-methoxy-1,1′-azobenzene. | ___do___ | Red. |
| 18 | 1-amino-4-nitrobenzene. | 1-amino-3-N-isobutyrylaminobenzene. | Red-orange. |
| 19 | ___do___ | 1-amino-3-N-propionylaminobenzene. | Do. |
| 20 | ___do___ | 1-amino-3-N-ethoxycarbonylaminobenzene. | Yellowish scarlet. |
| 21 | ___do___ | 1-amino-3-N-butyrylaminobenzene. | Red-orange. |
| 22 | ___do___ | 1-amino-3-N-butyrylaminocarbonylaminobenzene. | Yellowish-red. |
| 23 | ___do___ | 1-amino-3-N-methylsulphonylaminobenzene. | Orange. |
| 24 | ___do___ | 1-amino-3-N-(5′-carbomethoxythenyl)-aminobenzene. | Red-orange. |
| 25 | ___do___ | 1-amino-3-N-phenylcarbonylaminobenzene. | Do. |
| 26 | ___do___ | 1-amino-3-N-phenylaminocarbonylaminobenzene. | Yellow-red. |
| 27 | ___do___ | 1-amino-3-N-phenylsulphonylaminoaminobenzene. | Orange. |
| 28 | ___do___ | 1-amino-3-N-(para-tolylsulphonyl)-aminobenzene. | Do. |
| 29 | 1-amino-2,4-dinitrobenzene. | 1-amino-3-N-ethyloxycarbonyl-aminobenzene. | Bluish red. |
| 30 | ___do___ | 1-amino-3-N-butylaminocarbonylaminobenzene. | Claret. |
| 31 | ___do___ | 1-amino-3-N-methylsulphonylaminobenzene. | Yellow red. |
| 32 | ___do___ | 1-amino-3-N-benzoylaminobenzene. | Blue-red. |
| 33 | ___do___ | 1-amino-3-N-phenylaminocarbonylaminobenzene. | Bluish claret. |
| 34 | ___do___ | 1-amino-3-N-ethyloxycarbonyl-5-methylbenzene. | Blue-red. |
| 35 | 1-amino-2-bromo-4,6-dinitrobenzene. | 1-amino-3-N-ethyloxycarbonyl-aminobenzene. | Ruby. |

| | I | II | III |
|---|---|---|---|
| 36 | 1-amino-2-trifluoro-methyl-4-nitro-benzene. | 1-amino-3-N-acetyl-aminobenzene. | Bluish red. |
| 37 | 1-amino-2-methyl-4-nitro-benzene. | .....do................ | Scarlet. |
| 38 | 1-amino-2-methoxy-4-nitrobenzene. | .....do................ | Red. |
| 39 | 1-amino-2-phenyloxy-4-nitrobenzene. | .....do................ | Red. |
| 40 | 1-amino-2-methylsul-phonyl-4-nitro-benzene. | 1-amino-3-N-isobutyryl-aminobenzene. | Red. |
| 41 | 1-amino-2-chloro-4-nitrobenzene. | 1-amino-3-cinnamoyl-aminobenzene. | Scarlet. |
| 42 | 2-amino-5-nitrobenzoic acid methyl ester. | .....do................ | Red. |
| 43 | 1-amino-2-trifluoro-methyl-4-nitro-benzene. | .....do................ | Red. |
| 44 | 1-amino-2,6-dichloro-4-nitrobenzene. | .....do................ | Brown. |
| 45 | 2-amino-5-nitrobenzene-1-methylsulphone. | .....do................ | Red. |
| 46 | 4-amino-3-nitro-1,1-azobenzene. | .....do................ | Red. |
| 47 | 4-amino-3-nitro-4′-chloro-1,1′-benzene. | .....do................ | Red. |
| 48 | 4-amino-3-nitro-2′-chloro-1,1′-azobenzene. | .....do................ | Red. |
| 49 | 1-amino-2-chloro-4-nitrobenzene. | 1-amino-3-nicotinyl-aminobenzene. | Scarlet. |
| 50 | 1-amino-2,6-dichloro-4-nitrobenzene. | .....do................ | Brown. |
| 51 | 1-amino-3-nitro-1,1′-azobenzene. | .....do................ | Red. |
| 52 | 1-amino-2-chloro-4-methyl-sulphonyl-benzene. | 1-amino-3-benzoyl-aminobenzene. | Orange. |
| 53 | .........do................ | 1-amino-3-ethyloxy-carbonyl-amino-benzene. | Do. |

The N,3-acylamino compounds of aniline may be obtained by acylating meta-nitroaniline with a corresponding acyl chloride, for example, acetyl chloride, methylsulphonyl chloride or chloroformic acid ethyl ester, or with n-butylisocyanate and reducing the 3,N-acylamino-nitrobenzene so formed at the nitro group.

EXAMPLE 2

200 parts of urea are dissolved in 400 parts of water. 100 parts of an aqueous dispersion containing 30 parts of the dyestuff given in the first paragraph of Examples 1 and 2 parts of the sodium salt of diisobutylnaphthalenesulphonic acid are added to the solution, the batch is stirred vigorously for a few minutes in a vessel provided with a high-speed stirrer while at the same time adding 100 parts of a 20% sodium carbonate solution and 400 parts of a 5% sodium alginate solution.

A polyethylene terephthalate cloth is padded at 50 to 60° C. with the padding solution so obtained in a manner such that the impregnated material retains 65 to 70% of its dry weight of dyestuff solution, dried, and then the material is subjected to a heat treatment for one minute at 200 to 210° C.

The material is then washed at the boil for 20 minutes in a solution containing 2 g./l. of a non-ionic detergent and 2 g./l. of calcined sodium carbonate, rinsed, and then dried. A strong orange dyeing possessing very good properties of fastness is obtained.

EXAMPLE 3

A mixture is prepared from the following:

300 parts of gum arabic (1:1)
300 parts of crystal gum (1:2)
250 parts of water
40 parts of cyclohexane
40 parts of thiodiglycol
50 parts of a 10% solution of the sodium salt of meta-nitrobenzene sulphonic acid
20 parts of a mixture of potassium oleate and pine oil.

1000 parts 200 parts of the dyestuff preparation obtained in the manner described in the first paragraph of Example 1 are stirred into 800 parts of this stock thickening with the aid of a high-speed stirrer until completely dispersed.

A polyethylene terephthalate fabric is printed with this paste. After printing, the fabric is dried, steamed for 45 minutes under a pressure of ¾ atmosphere (excess pressure), rinsed for 10 minutes in cold water, centrifuged and dried. A fast orange print is obtained.

What is claimed is:

1. An azo dyestuff of the formula

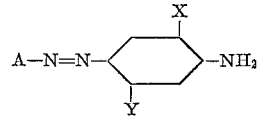

in which A represents the residue of an aromatic diazo component of the benzene series carrying in para-position to the azo group a group with a positive Hammet sigma value, X is hydrogen, methyl or $C_1$–$C_2$-alkoxy, and Y is a hydrocarbyloxycarbonylamino containing up to 6 carbon atoms, hydroboylamino containing up to 8 carbon atoms, hydrocarbyloxycarbonylamino containing up to 6 carbon atoms or hydrocarbylaminocarbonylamine containing up to 8 carbon atoms.

2. An azo dyestuff of claim 1 of the formula

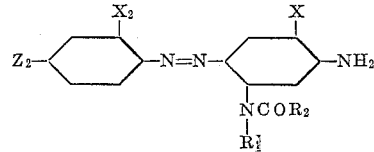

in which $R_1$ is hydrogen or methyl, X is hydrogen, $C_{1-2}$-alkoxy, methyl or dimethylamino, $R_2$ is alkyl of up to 8 carbon atoms, alkoxy of up to 6 carbon atoms, aralkyl of up to 7 carbon atoms or aryl of up to 6 carbon atoms, $Z_2$ is hydrogen, nitro, chloro, bromo, cyano, carbomethoxy, methylsulfonyl, carboethoxy or methyl and $X_2$ represents hydrogen, chloro, cyano, bromo, methyl, trifluoromethyl, methoxy, carbomethoxy, phenoxy, methylsulfonyl, cyanomethylsulfonyl, or nitro.

3. An azo dyestuff according to claim 2, in which $COR_2$ represents a cinnamoyl or benzoyl group.

4. An azo dyestuff according to claim 1 of the formula

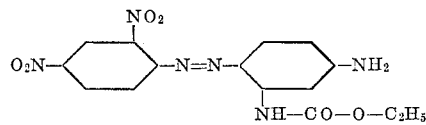

5. An azo dyestuff according to claim 1 of the formula

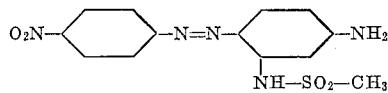

6. An azo dyestuff according to claim 1 of the formula

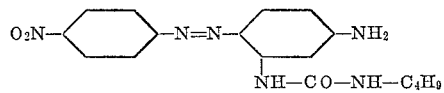

7. An azo dyestuff according to claim 1 of the formula

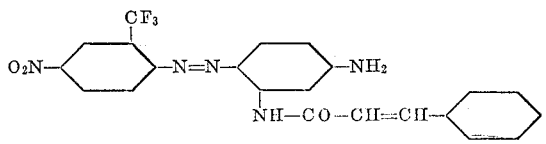

(References on following page)

References Cited

UNITED STATES PATENTS

| | | | |
|---|---|---|---|
| 2,083,308 | 6/1937 | Senn | 260—207.1 |
| 2,289,349 | 7/1942 | Dickey et al. | 260—205 |
| 2,289,376 | 7/1942 | McNally et al. | 260—205 |
| 2,289,414 | 7/1942 | Ellis et al. | 260—187 X |
| 2,606,898 | 8/1952 | Salvin et al. | 260—187 |
| 3,342,804 | 9/1967 | Mueller | 260—207.1 |
| 3,398,135 | 8/1968 | Mueller | 260—107.1 X |

OTHER REFERENCES

Grammaticakis, Bull. Chem. Soc. France, volume of 1957, pp. 129–138.

Le Bris et al., Bull. Chem. Soc. France, volume of 1959, pp. 343–347.

Porai-Koshits et al., Chem. Abstr., vol. 51, p. 5053 (1957).

FLOYD DALE HIGEL, Primary Examiner

U.S. Cl. X.R.

8—41 C, 71; 117—138.8 F; 260—40 R, 156, 187, 207, 207.1.

UNITED STATES PATENT OFFICE
CERTIFICATE OF CORRECTION

PO-1050
(5/69)

Patent No. 3,632,569                      Dated January 4, 1972

Inventor(s) KLAUS ARTZ ET AL

It is certified that error appears in the above-identified patent and that said Letters Patent are hereby corrected as shown below:

Column 8, line 19, should read: "hydrocarbylsulfonylamino containing up to 7 carbon".

Column 8, line 20, "hydroboylamino" should read: --- hydrocarboylamino ---.

Column 8, line 22, "hydrocarbylaminocarbonylamine" should read --- hydrocarbylaminocarbonylamino ---.

Signed and sealed this 4th day of July 1972.

(SEAL)
Attest:

EDWARD M. FLETCHER, JR.                ROBERT GOTTSCHALK
Attesting Officer                      Commissioner of Patents